United States Patent
Chen et al.

(10) Patent No.: US 11,658,569 B2
(45) Date of Patent: May 23, 2023

(54) LOAD LINE REGULATION FOR POWER CONVERTERS

(71) Applicant: Infineon Technologies Austria AG, Villach (AT)

(72) Inventors: Keng Chen, Acton, MA (US); Charles Amirault, Nashua, NH (US); James Garret, Windham, NH (US)

(73) Assignee: Infineon Technologies Austria AG

(*) Notice: Subject to any disclaimer, the term of this patent is extended or adjusted under 35 U.S.C. 154(b) by 417 days.

(21) Appl. No.: 16/895,760

(22) Filed: Jun. 8, 2020

(65) Prior Publication Data
US 2021/0384821 A1   Dec. 9, 2021

(51) Int. Cl.
*H02M 3/155* (2006.01)
*H02M 1/32* (2007.01)

(52) U.S. Cl.
CPC ............. *H02M 3/155* (2013.01); *H02M 1/32* (2013.01)

(58) Field of Classification Search
CPC .... H02M 3/155; H02M 3/156; H02M 3/1563; H02M 3/157; H02M 3/137; H02M 3/139
See application file for complete search history.

(56) References Cited

U.S. PATENT DOCUMENTS

| | | | |
|---|---|---|---|
| 2006/0152205 A1* | 7/2006 | Tang | H02M 3/1584 323/284 |
| 2009/0121695 A1 | 5/2009 | Pierson et al. | |
| 2013/0293310 A1* | 11/2013 | Levesque | H03F 3/72 323/311 |
| 2014/0091778 A1 | 4/2014 | Chen | |
| 2014/0333270 A1* | 11/2014 | Young | G05F 1/12 323/234 |

OTHER PUBLICATIONS

"IR3888 OptiMOS™ IPOL—25 A single-voltage synchronous Buck regulator", Infineon Technologies AG, Rev. 2.1, Dec. 16, 2019, Accessed at https://www.infineon.com/dgdl/Infineon-IR3888MTRPBF-DataSheet-v01_00-EN.pdf?fileId=5546d4626eab8fbf016f1604cc0d782c on Jun. 8, 2020.

* cited by examiner

*Primary Examiner* — Nguyen Tran
(74) *Attorney, Agent, or Firm* — Murphy, Bilak & Homiller, PLLC (57) ABSTRACT

A method of implementing a load line in a power converter includes: adjusting a target voltage used to regulate an output voltage of the power converter, based on sensed load current information that has delay between updates; and responsive to detecting a load current transient and before the next update to the sensed load current information becomes available, adjusting the target voltage based on blind load current information. A corresponding controller, power converter and electronic system are also described.

21 Claims, 7 Drawing Sheets

LOAD LINE REGULATION FOR POWER CONVERTERS

BACKGROUND

For some POL (point-of-load) power converter products, load line regulation is a required feature. Load line regulation involves adjusting a target voltage based on sensed current information. Accurate load line regulation requires readily available sensed current information to adjust the target voltage during load transients. However, for some types of power converter such as constant-ON-time (COT) switching buck regulators which have a fixed ON-time and use off-time pulse width modulation (PWM) to regulate an output voltage, current information is not sensed continuously but rather updated periodically, e.g., at the beginning or end of each PWM pulse.

Noncontinuous current sensing schemes add time delay to the target voltage adjustment, especially during large negative transitions in current (load release) when current information updates may be unavailable. In the case of a COT switching buck regulator, no PWM pulses are provided during a load release, thus delaying when new current information becomes available. A prolonged period of no newly available current sense information causes the load line update to be delayed, resulting in an additional undesired transient in the power converter output voltage.

In the case of a power converter that delivers current to a load through an inductor, a digital current emulator may mimic the inductor current. The emulated inductor current information may be used to adjust the target voltage as part of load line regulation. While a digital current emulator provides a very fast current assumption and enables load line regulation with minimal clock delay, accurate current emulation information requires knowledge of the actual inductor value and an analog current sensing is still required to keep the digitally emulated steady state current accurate. For the emulator circuit to know the inductor value, the customer must enter the inductor value into a communication portal. Also, there is always some inaccuracy between an assumed inductor value and the actual inductor value due to component tolerances.

Thus, there is a need for an improved load line regulation scheme for power converters that implement load line regulation using sensed load current information that has delay between updates.

SUMMARY

According to an embodiment of a method of implementing a load line in a power converter, the method comprises: adjusting a target voltage used to regulate an output voltage of the power converter, based on sensed load current information that has delay between updates; and responsive to detecting a load current transient and before the next update to the sensed load current information becomes available, adjusting the target voltage based on blind load current information.

According to an embodiment of a controller configured to implement a load line for a power converter, the controller comprises: a modulator configured to adjust a target voltage used to regulate an output voltage of the power converter, based on sensed load current information that has delay between updates; and a transient response circuit configured to detect a load current transient and responsive to detecting the load current transient and before the next update to the sensed load current information becomes available, to adjust the target voltage based on blind load current information.

According to an embodiment of a power converter, the power converter comprises: at least one phase configured to provide a phase current to a load coupled to the power converter; and a controller configured to implement a load line for the power converter. The controller comprises: a modulator configured to adjust a target voltage used to regulate an output voltage of the power converter, based on sensed load current information that has delay between updates; and a transient response circuit configured to detect a load current transient and responsive to detecting the load current transient and before the next update to the sensed load current information becomes available, to adjust the target voltage based on blind load current information.

According to an embodiment of an electronic system, the electronic system comprises: a circuit board; a load attached to the circuit board; and a power converter configured to provide power to the load. The power converter comprises: at least one phase configured to provide a phase current to the load; and a controller configured to implement a load line for the power converter. The controller comprises: a modulator configured to adjust a target voltage used to regulate an output voltage of the power converter provided to the load, based on sensed load current information that has delay between updates; and a transient response circuit configured to detect a load current transient at the load and responsive to detecting the load current transient and before the next update to the sensed load current information becomes available, to adjust the target voltage based on blind load current information.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a load line regulation technique for power converters. The load line regulation technique includes adjusting a target voltage used to regulate an output voltage of the power converter, based on sensed load current information that has delay between updates. For example, in the case of a COT power converter, the current information may be updated at the beginning or end of each PWM pulse. In general, any current sensing technique that has delay between updates may be used. Responsive to detecting a load current transient and before the next update to the sensed load current information becomes available, the load line regulation technique described herein adjusts the target voltage based on blind load current information. The expression 'based on blind load current information' as used herein means without knowledge of the actual load current during at least part of a load transient.

Figure 1:
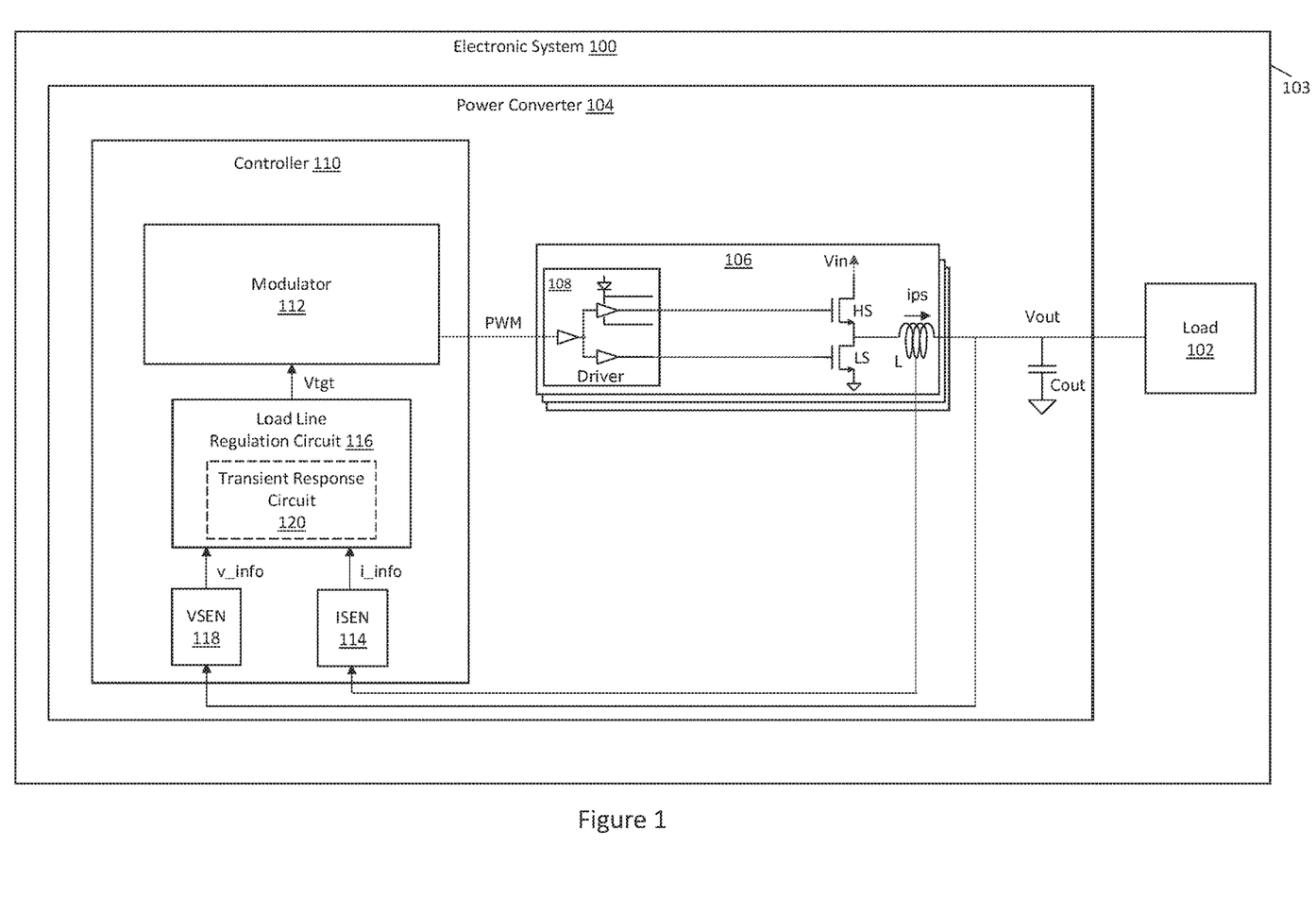
FIG. 1 illustrates a block diagram of an embodiment of an electronic system that includes a load attached to a board, and a power converter configured to regulate an output voltage provided to the load.

FIG. 1 illustrates an embodiment of an electronic system 100 that includes a load 102 attached to a board 103 such as a PCB (printed circuit board), and a power converter 104 configured to regulate an output voltage (Vout) provided to the load 102. The power converter 104 is shown as a buck converter in FIG. 1 merely as an example. In this example, the power converter 104 includes one or more power stages 106, each power stage 106 forming a phase of the power converter 104. The power converter 104 may be single-phase (one power stage 106) or multi-phase (more than one power stage 106).

The term "power converter" as used herein broadly refers to any type of power converter or voltage regulator (VR) that provides one or more regulated voltages to one or more electronic loads 102 such as an Ethernet switch, an ASIC (application-specification integrated circuit), a memory device, a processor such as a central processing unit (CPU), microprocessor, graphics processing unit (GPU), digital signal processor (DSP), artificial intelligence (AI) accelerator, image processor, network or packet processor, coprocessor, multi-core processor, front-end processor, baseband processor, etc. For example, the power converter 104 may be a buck converter as shown in FIG. 1, a boost converter, a buck-boost converter, a switched capacitor voltage regulator, a step-down converter, a point-of-load (POL) power supply, etc. The power converter 104 may be implemented as a power device module.

The term "power device module" as used herein means a packaged functional assembly that includes at least one power switch HS/LS of a power stage 106 used in converting a voltage from one level to another level, e.g., as is done in power conversion and voltage regulation. The power device module may also include a driver circuit 108 for driving the at least one power switch HS/LS. The power device module may additionally include a controller 110 for controlling the driver circuit 108 so as to implement the power converter 104. The controller and/or driver functionality may instead be implemented outside the power device module. The driver circuit 108 for the at least one power switch HS/LS included in the power device module also may be outside the power device module. Various passive components such as capacitors (Cout) and/or inductors (L) that make up the power converter 104 may be included in the power device module, surface mounted to the power device module, located on a separate board 103, etc.

Each power stage 106 of the power converter 104 is configured to provide a current (ips) to the load 102 through a respective inductor L and an output capacitor Cout which reduces output voltage ripple. The controller 110 generates a switching control signal (PWM) for each (single or multi) phase so as to regulate the output voltage Vout provided to the load 102.

The power converter controller 110 includes a modulator 112 for generating the switching control signal PWM for each phase, to regulate the output voltage Vout provided to the load 102. In one embodiment, the modulator 112 implements pulse width modulation (PWM).

The power converter controller 110 also includes a current sense circuit 114 for frequently but not continuously sensing the phase current ips delivered by each power stage 106 and providing the sensed current information (i_info) to a load line regulation circuit 116 included in the controller 110. The load line regulation circuit 116 updates a target voltage value 'Vtgt' based on changes in the sensed current information i_info, to regulate the output voltage Vout of the power converter 104 based on the updated target value. The current sense circuit 114 preferably updates the sensed current information i_info as fast as possible, but not continuously. The current sense circuit 114 may implement any current sensing technique that has delay between current sense updates. For example, in the case of PWM modulation, the current sense circuit 114 may update the current information i_info at the beginning or end of each PWM pulse. The current sense circuit 114 may also implement overcurrent protection and/or provide current telemetry information over an output pin (not shown) of the controller 110.

The power converter controller 110 may also include a voltage sense circuit 118 for sensing the output voltage Vout of the power converter 104 and providing the sensed voltage information (v_info) to the load line regulation circuit 116. The load line regulation circuit 116 may update the target voltage value based on changes in the voltage information v_info, to regulate the output voltage Vout of the power converter 104 based on the updated target voltage value Vtgt. The modulator 112 included in the controller 108 generates a switching control signal 'PWM' for each phase of the power converter 104 based on the target voltage Vtgt indicated by the load line regulation circuit 116. The modulator 112 and the load line regulation circuit 116 may be implemented as a single unit or as separate units, in the analog and/or digital domain.

During ON periods of the switching control signal 'PWM', the high-side switch device 'HS' of each power stage 106 connects the corresponding inductor L to a supply voltage (Vin). The low-side switch device 'LS' of the power stage 106 connects the inductor L to ground or another reference potential during OFF periods of the switching control signal 'PWM'. The high-side and low-side switch devices 'HS', 'LS' may be power MSOFETs (metal-oxide-semiconductor field effect transistors), IGBTs (insulated gate bipolar transistors), HEMTs (high-electron mobility transistors), etc. The duration of the ON and OFF periods and timing transitions therebetween are indicated by the corresponding switching control signal 'PWM' provide by the modulator 112.

As explained above, the modulator adjusts the target voltage Vtgt used to regulate the output voltage Vout of the power converter 104 provided to the load 102 based on sensed load current information i_info that has delay between updates. A transient response circuit 120 included in or associated with the load line regulation circuit 116 detects a load current transient at the load 102. Responsive to detecting the load current transient and before the next update to the sensed load current information i_info becomes available, the transient response circuit 120 adjusts the target voltage Vtgt used for load line regulation based on blind load current information.

For example, the load line regulation circuit 116 may utilize a floor voltage signal as part of a constant-on-time (COT) control scheme implemented by the modulator 112. The COT control compares the sensed output voltage information v_info to a floor voltage 'Vflr' combined with an internal ramp signal 'Vrmp'. When the regulator output voltage Vout drops below the combined voltage signal, the modulator 112 initiates a PWM pulse to turn on the high-side switch device HS of the corresponding power stage 106 for a fixed on-time. The floor voltage may be generated from an internal compensated error amplifier, which compares the sensed output voltage information v_info with a reference voltage 'Vref'. The transient response circuit 120 may detect a load current transient at the load 102 by comparing the floor voltage signal Vflr to a threshold value and outputting a signal when the floor voltage Vflr passes the threshold value to indicate the load current transient has been detected.

In another example, the modulator 112 may implement PWM control in regulating the output voltage Vout of the power converter 104 and the transient response circuit 120 may detect a load current transient when the pulse frequency of the PWM control changes by a predetermined amount. To illustrate this example in more detail, consider a steady-state (no load transients) PWM pulse frequency of 800 kHz+/−5%. Under transient conditions, a frequency shift outside the +/−5% steady-state range occurs. For example, a frequency shift of 20% or more may to the PWM pulse frequency may occur during load current transient events. The transient response circuit 120 may detect a load current transient by comparing the PWM pulse frequency or PWM period to a threshold and signalling when the threshold is exceeded.

In yet another example, the transient response circuit 120 may detect a load current transient when an overshoot of the output voltage Vout exceeds a threshold, e.g., as indicated by the voltage sense circuit 118. In each case, responsive to detecting a load current transient and before the next update to the sensed load current information i_info becomes available, the transient response circuit 120 adjusts the target voltage used in load line regulation based on blind load current information.

Figure 2:
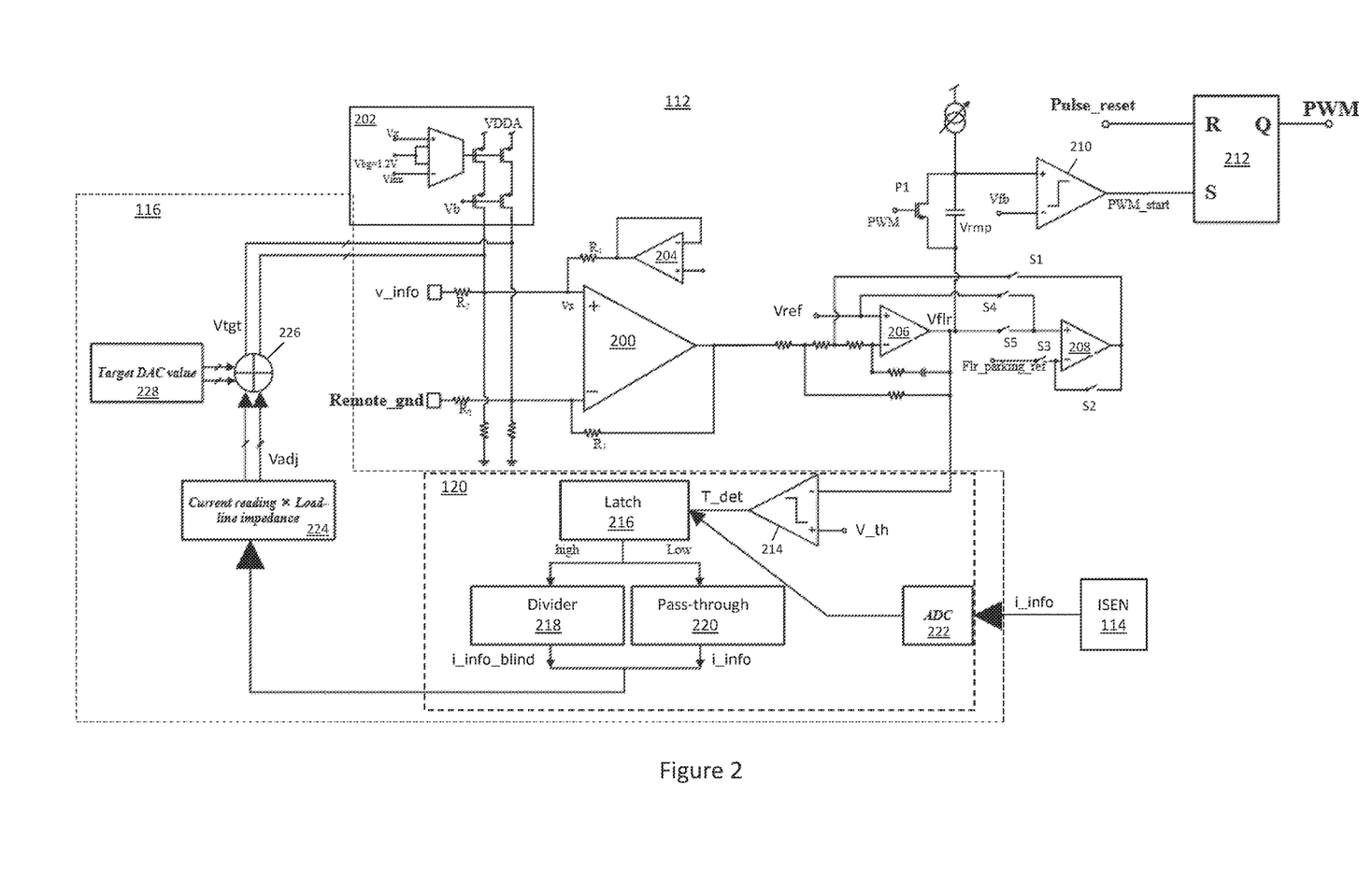
FIG. 2 illustrates a block diagram of an embodiment of a modulator, load line regulation circuit and transient response circuit included in the power converter shown in FIG. 1.

FIG. 2 illustrates an embodiment of the modulator 112, load line regulation circuit 116 and transient response circuit 120 of the power converter 104. According to this embodiment, the modulator 112 implements a constant-on-time (COT) control scheme. Under the COT control scheme, the switching control signal 'PWM' generated by the modulator 112 has a fixed ON-time. The modulator 112 varies the OFF time between PWM pulses to regulate the output voltage Vout of the power converter 104.

The modulator 112 includes an analog front end (AFE) sensing amplifier 200. The positive (+) input terminal of the analog front end sensing amplifier 200 is coupled to a non-inverting amplifier 202 and to the sensed output voltage v_info provided by the voltage sense circuit 118. The negative (−) input terminal of the analog front end sensing amplifier 200 is coupled to ground or reference potential 'Remote_gnd'. A reference current generator 204 is coupled to the input terminals of the analog front end sensing amplifier 200 for providing proper biasing via an analog supply VDDA. The output of the analog front end sensing amplifier 200 corresponds to a reference voltage Vref (e.g. 600 mV)+(Vout−Vtgt) where Vtgt is the target voltage determined by the load line regulation circuit 116.

The output of the analog front end sensing amplifier 200 is fed to a floor reference voltage generator. The floor reference voltage generator includes a floor regulation amplifier 206 that regulates the output of the analog front end sensing amplifier 200 and generates a floor voltage V_flr. The floor reference voltage generator also includes a floor parking amplifier 208 and switches S1, S2, S3, S4 and S5. The negative input terminal of the floor parking amplifier 208 is switchably coupled to a parking voltage reference value 'Flr_parking_ref' via switch S3. The positive input terminal of the floor parking amplifier 208 is switchably coupled to the reference voltage Vref via switch S4. Switch S2 couples the input terminal of the floor parking amplifier 208 to the output of the floor parking amplifier 208, which is also switchably coupled to the negative input of the floor regulation amplifier 206 via switch S1. Switch S5 couples the output (Vflr) of the floor regulation amplifier 206 to the positive input of the floor parking amplifier 208. The controller 110 controls an operational mode setting of the floor reference voltage generator 110 based on settings of switches SW1, SW2, and SW3.

A parking voltage reference value 'Flr_parking_ref' (e.g. a predetermined fixed DC voltage value) is selectively coupled to the negative input of the floor parking amplifier 208 via switch SW3 and the positive input of the floor parking amplifier 208 is selectively coupled to receive the floor reference voltage Vflr via switch S5. In floor regulation mode, a negative feedback mechanism is employed. For COT operation, the switching frequency is tuned to ensure accuracy which is reflected by steady-state operation of the floor regulation amplifier 206. The floor parking amplifier 208 is configured for unity gain feedback in the floor regulation mode. Floor regulation mode is enabled by closing switches S2 and S4 and opening switches S1, S3 and S5. In diode emulation mode, the floor is fixed and the voltage ramp Vrmp is claimed at a voltage (e.g. 50 mV) above the floor voltage Vflr. The circuit operates in an open-loop, valley-controlled condition in diode emulation mode. The valley is fixed at a target value and the regulation error is based on the ripple of the power converter output voltage Vout. Diode emulation mode is enabled by closing switches S1, S3 and S5 and opening switches S2 and S4.

A ramp voltage Vrmp is added to the floor voltage Vflr output by the floor regulation amplifier 206. A pMOS switch P1 resets the ramp voltage 'Vrmp' at the end of each PWM pulse. A comparator 210 compares the combined ramp plus floor voltage to the output 'Vfb' of an analog front-end circuit. As the ramp voltage continues to build, the combined ramp plus floor voltage eventually exceeds the analog front-end circuit output Vfb which triggers the initiation of a new PWM pulse by signal 'PWM_start' setting a latch 212 such as an SR flip-flop. The output of the latch 212 forms the switching control signal 'PWM' for the corresponding power stage 106 of the power converter 104. The latch 212 is reset by a signal 'Pulse_reset'. The width of each PWM pulse output by the latch 212 is a fixed value but the OFF time between PWM pulses is variable, hence constant on time regulation in this embodiment. Modulation schemes other than PWM COT may be implemented by the modulator 112, such as variable on-time PWM, pulse frequency modulation (PFM), bang-bang modulation, etc.

Further according to the PWM COT embodiment, the transient response circuit 120 includes a comparator 214 that compares the floor voltage signal Vflr used in the COT control scheme implemented by the modulator 112 to a threshold value 'V_th'. A sudden drop in the floor voltage Vflr indicates a load step, and the steepness of the drop in Vflr indicates the magnitude of the load step. The threshold value 'V_th' used by the comparator 214 to detect a load current transient may be fixed or programmable. In the case of a programmable threshold, load current transients of different magnitudes may be detected.

The comparator 214 of the transient response circuit 120 outputs a signal 'T_det' when the floor voltage Vflr passes the threshold value V_th, indicating that a load current transient has been detected. The output T_det of the comparator 214 may set a latch 216. The comparator 214 of the transient response circuit 120 may compare any signal available within the controller 110 and indicative of a load current transient to a corresponding threshold value V_th to detect when a load current transient occurs. For example, the comparator 214 of the transient response circuit 120 may detect a load current transient by comparing the PWM pulse frequency or PWM period of the modulation signal PWM provided to each power stage 106 to a threshold V_th and activate the signal 'T_det' when the threshold is exceeded. In another example, the comparator 214 of the transient response circuit 120 may compare the sensed output voltage information v_info to a threshold V_th and activate the signal 'T_det' when the threshold is exceeded (voltage overshoot in this example). In yet another example, the comparator 214 of the transient response circuit 120 may compare an AFE analog signal which is indicative of a load current transient to a threshold V_th and activate the signal 'T_det' when the threshold is exceeded.

In the case of the detected load current transient corresponding to a drop in load current, a divider circuit 218 of the transient response circuit 120 divides the most recent sensed load current information i_info update available prior to detecting the load current transient by a scaling factor if the output T_det of the latch 214 indicates the floor voltage signal Vflr passed the threshold value V_th, to generate a blindly scaled current value 'i_info_blind'. In other words, the transient response circuit 120 divides down the last known current measurement i_info by some value, and the divided-down value is used to adjust the load line response and modify the target voltage Vtgt.

In one embodiment, the divider circuit 218 divides the most recent sensed load current information update i_info available prior to detecting the load current transient by a positive integer greater than or equal to 2. In one case, the integer may be infinitely large which corresponds to a blindly scaled current value i_info_blind of zero amps. An infinitely large divisor results in the most undershoot in Vout but will still produce a better result than the original overshoot problem which can lead to instability. Some additional exemplary divisor integer values are 2, 4, 8, 16, etc. Still other integer divisors as well as non-integer divisor values may be used. The integer value used in scaling may be programmable. In each case, the output of the divider circuit 218 is considered 'blind' since it is not based on explicit knowledge of the actual load current during at least a portion of the load transient.

If actual load current information were available during the load transient event, this information may be used instead of blind current information. For example, when the next current information update i_info becomes available, the corresponding latch 216 may be reset by the newly available current information update i_info to indicate that new current sense information is available. The transient response circuit 120 may include a pass-through circuit 220 that provides the newly available sensed load current information i_info without modification. If the sensed load current information i_info is provided as an analog signal and the transient response circuit 120 is implemented in the digital domain, the transient response circuit 120 may include an analog-to-digital converter (ADC) 222 for converting the analog sensed load current information to the digital domain.

The load line regulation circuit 116 includes a multiplication unit 224 that multiples a load-line impedance value by either the unscaled sensed load current information i_info provided by the pass-through circuit 220 or the blind load current information i_info_blind provided by the divider circuit 218 to generate a voltage adjustment value 'Vadj' for adjusting the load-line regulation setpoint. If a load transient was detected, then the multiplication unit 224 multiples the load-line impedance value by the blind load current information i_info_blind provided by the divider circuit 218. If no load transient was detected, the multiplication unit 224 multiples the load-line impedance value by the unscaled sensed load current information i_info provided by the pass-through circuit 220.

The load line regulation circuit 116 also includes a modification circuit 226 for combining the voltage adjustment value Vadj generated by the multiplication unit 224 with a target DAC value 228. The target DAC value 228 may be fixed or programmable and indicates the base target voltage to be used in load line regulation. As the load current changes, so to does the load line. The voltage adjustment value Vadj generated by the multiplication unit 224 provides the corresponding adjustment to ensure proper load line regulation over the operating range of the load 102. The output of the modification circuit 226 is the target voltage Vtgt used by the modulator 112 to regulate the output voltage Vout of the power converter 104, as previously explained herein.

Figure 3:
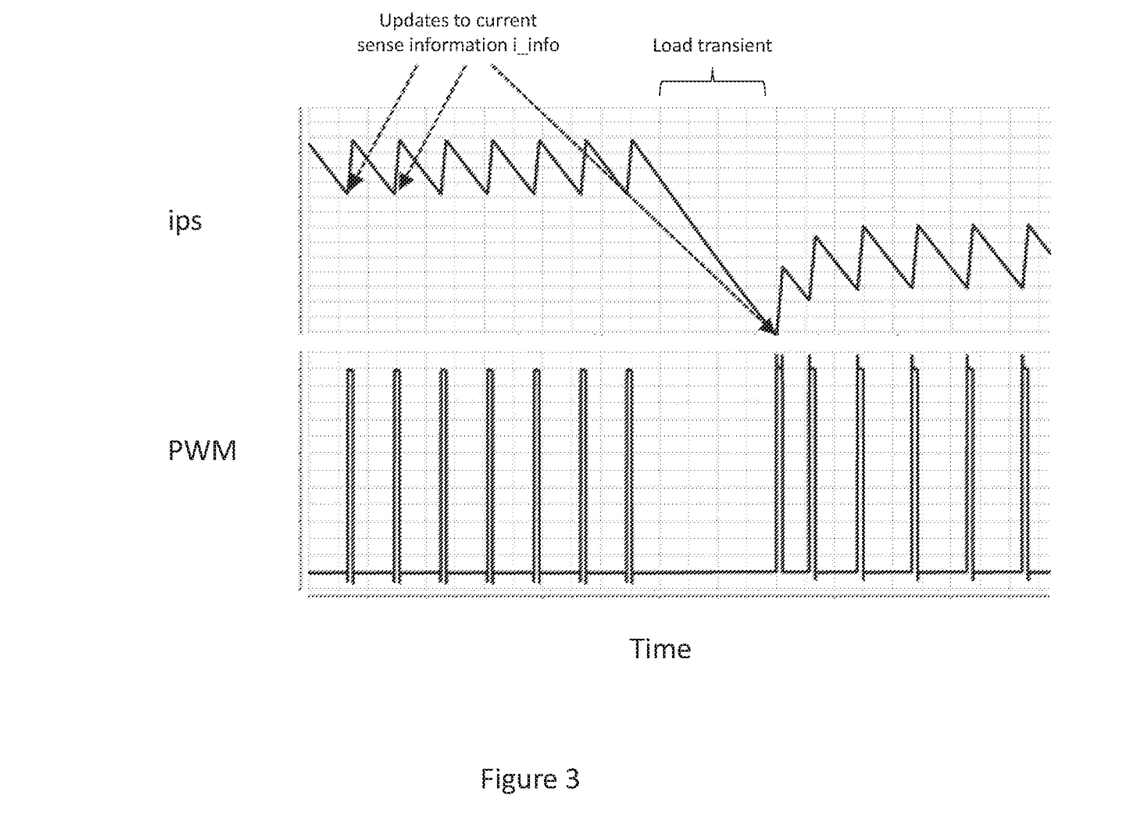
FIGS. 3 and 4 illustrate various waveforms associated with operation of the modulator, load line regulation circuit and transient response circuit.
Figure 4:
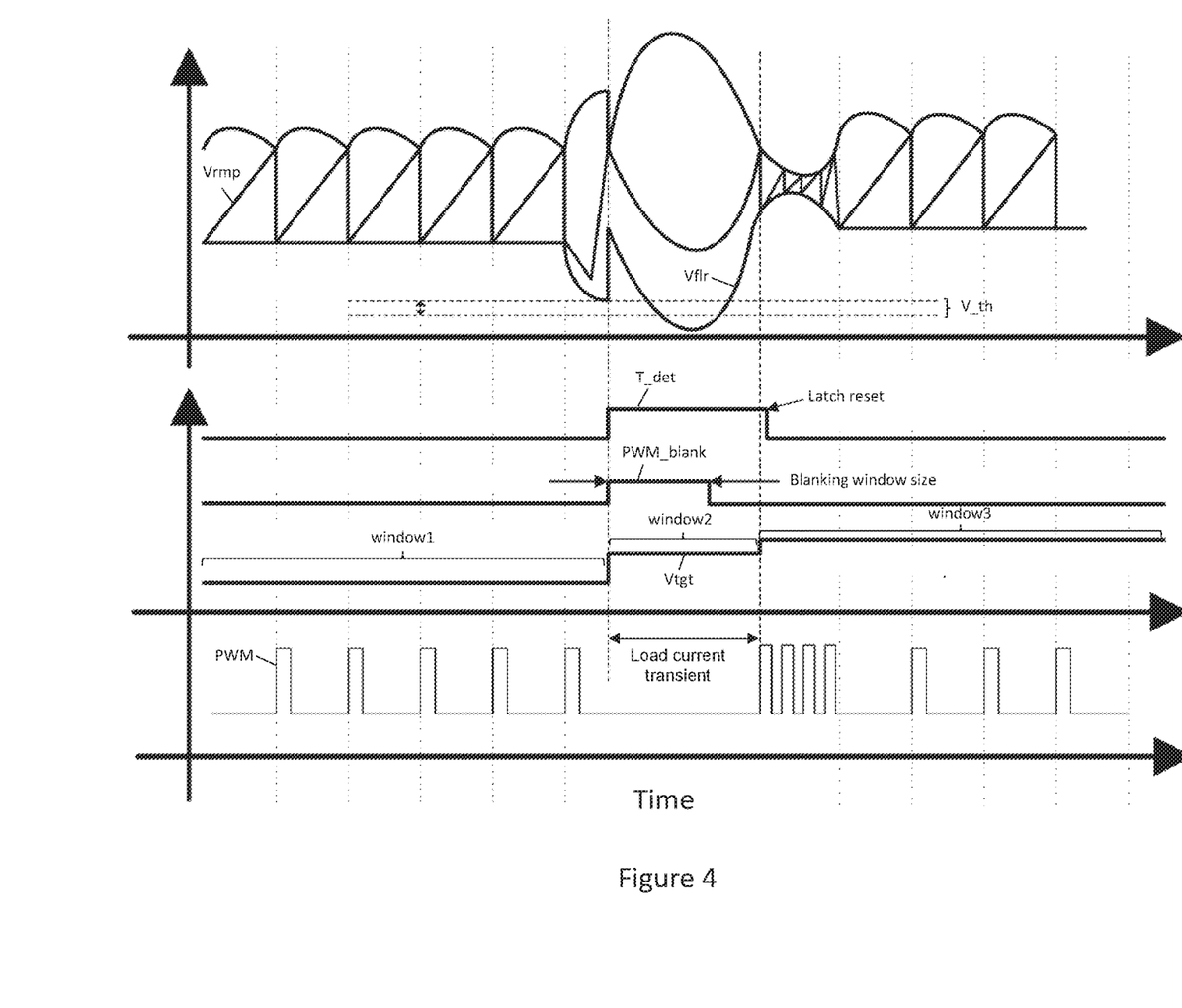

FIGS. 3 and 4 illustrate various waveforms associated with operation of the modulator 112, load line regulation circuit 116 and transient response circuit 120 of the power converter 104. FIG. 3 shows the switching control signal PWM generated by the modulator 112 with constant on-time, and the phase current ips delivered by the corresponding power stage 106 in response. In this example, the sensed current information i_info is updated at the beginning of each PWM pulse. During a load transient event, no PWM pulses are activated. As a result, no updates to the sensed current information i_info become available until after the load transient event subsides and PWM pulses resume. The last update to the sensed current information i_info taken just before the transient load event is significantly higher than the actual load current during the transient event. If load line regulation is implemented based on the last update to the sensed current information i_info, high overshoot in the output voltage Vout of the power converter 104 is expected. However, the transient response circuit 120 prevents such overshoot by detecting the load current transient and before the next update to the sensed load current information i_info becomes available, adjusting the target voltage Vtgt used in load line regulation based on blind load current information i_info_blind.

FIG. 4 illustrates this aspect of the disclosure in more detail. The top plot in FIG. 4 shows the internal ramp signal Vrmp and the floor voltage signal Vflr for the COT engine illustrated in FIG. 2. The middle plot in FIG. 4 shows the signal T_det output by the comparator 214 of the transient response circuit 120 and which sets a corresponding latch 216, a blanking signal 'PWM_blank' generated by the modulator 112 or the load line load line regulation circuit 116 for blanking PWM pulses (no PWM pulses) over a duration of the load current transient event where the blanking period may be one programmed PWM cycle, and the target voltage Vtgt used in load line regulation. The bottom plot in FIG. 4 shows the PWM pulse train generated by the modulator 112.

According to the COT PWM embodiment previously described herein, the output T_det of the comparator 214 of the transient response circuit 120 is activated (e.g. goes to logic one state) when the floor voltage signal Vflr used in the COT control scheme implemented by the modulator 112 exceeds a threshold value V_th. As previously explained herein, the comparator 214 of the transient response circuit 120 may compare any signal available within the controller 110 and that is indicative of a load current transient to the threshold value V_th for detecting when a load current transient occurs. For example, the comparator 214 may detect a load current transient by comparing the PWM pulse frequency or PWM period of the modulation signal PWM provided to each power stage 106 to the threshold V_th and activate the signal T_det when the threshold is exceeded. In another example, the comparator 214 may compare the sensed output voltage information v_info to the threshold V_th and activate the signal T_det when the threshold is exceeded. In yet another example, the comparator 214 may compare an AFE analog signal which is indicative of a load current transient to a threshold V_th and activate the signal T_det when the threshold is exceeded.

In each case, the threshold value V_th may be programmable as indicated by the horizontal dashed lines and solid vertical line with arrows extending therebetween in the top plot of FIG. 4, to allow for detection of load current transient events of different magnitudes. The corresponding latch 216 is set by the activated output T_det of the comparator 214. The latch 216 may be reset (e.g. to a logic zero state) based on a programmed pulse, e.g., $1^{st}$, $2^{nd}$, $3^{rd}$, etc. pulse after detection of the load current transient event. The latch 216 may instead be reset responsive to a new update for the sensed load current information i_info. For example, the latch 216 may be reset when the output of the ADC 222 shown in FIG. 2 changes values.

In response to detecting a load current transient, the transient response circuit 120 adjusts the target voltage Vtgt based on blind load current information i_info_blind. In one embodiment, the blind load current information i_info_blind is generated by scaling the sensed load current information update i_info available prior to detecting the load current transient by a scaling factor to generate a blindly scaled current value and adjusting the target voltage Vtgt based on the blindly scaled current value. As previously explained in connection with FIG. 2, the scaling may involve arbitrarily dividing the sensed load current information update i_info available prior to detecting the load current transient by an integer value (e.g., 2, 4, 8, 16, etc.) which may or may not be programmable.

PWM pulses resume upon recovery from the load current transient, as indicated in the bottom plot of FIG. 4. As the PWM pulses resume, so do updates to the sensed load current information i_info in this example. The transient response circuit 120 adjusts the target voltage Vtgt used in load line regulation based on the new updates to the sensed load current information i_info that become available. This is shown in the middle plot of FIG. 4, where the transient response circuit 120 goes from providing the sensed load current information i_info to the load line regulation circuit 116 prior to detecting the load current transient (window 1), providing the blind load current information i_info_blind responsive to detecting the load current transient (window 2), and then reverting back to providing the sensed load current information i_info as new load current updates become available (window 3). In windows 1 and 3, the target voltage Vtgt used in load line regulation is adjusted based on actual updates to the sensed load current information i_info.

In window 2, when updates to the sensed load current information i_info are unavailable, the target voltage Vtgt used in load line regulation is adjusted based on the blind load current information i_info_blind provided by the transient response circuit 120.

Figure 5:
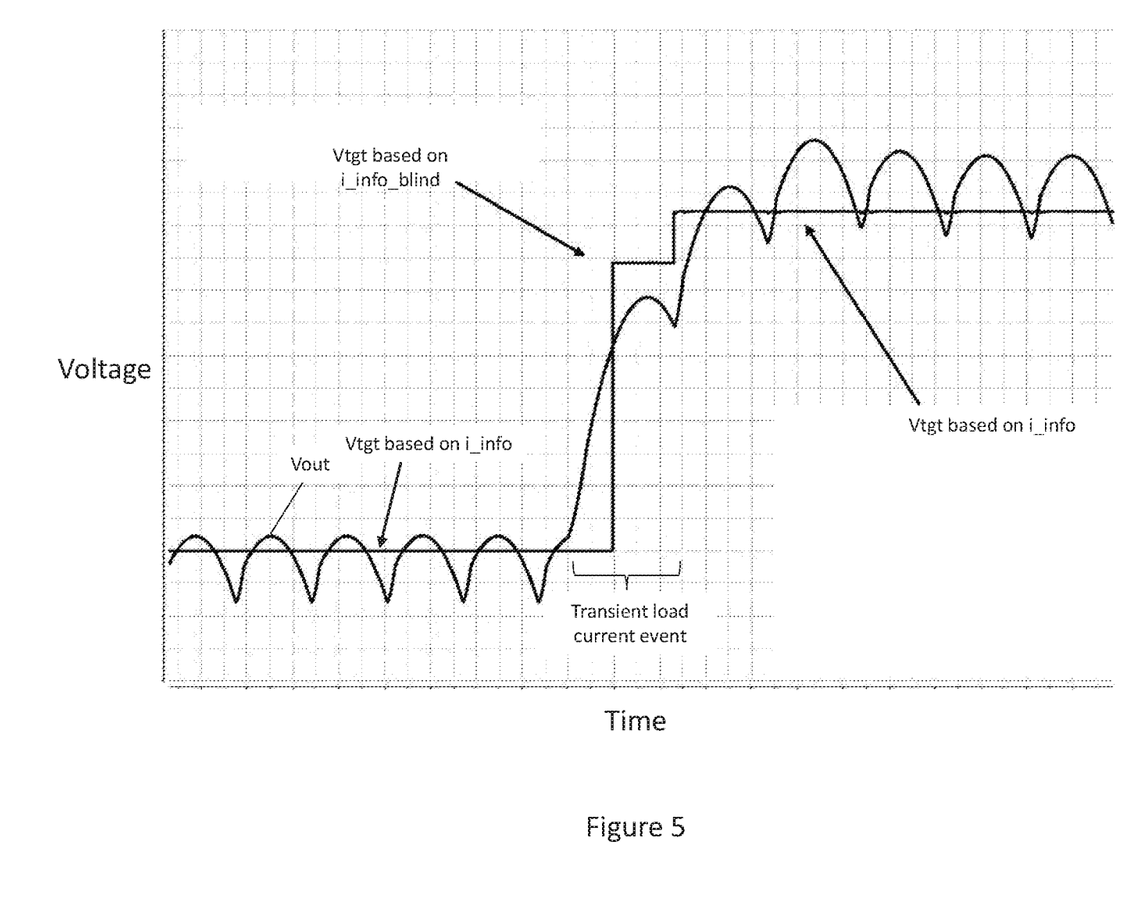
FIG. 5 illustrates a waveform diagram of an embodiment of the blind load line adjustment technique described herein.

FIG. 5 illustrates an embodiment of the blind load line adjustment technique described herein. As shown in FIG. 5, prior to a transient load current event, the load line regulation circuit 116 updates the target voltage value Vtgt used in the load line regulation based on frequent but not continuous updates to the sensed current information i_info. In response to detecting the load current transient, the transient response circuit 120 adjust the target voltage Vtgt based on blind load current information i_info_blind instead of the last known current measurement. This allows for a smother transition of the power converter output voltage Vout Eventually new/ real current sense values become available again and are used to provide further fine adjustment of the output voltage regulation. If instead the last known current measurement was used as part of the load line regulation process during the transient load current event, the target voltage Vtgt and hence the output voltage Vout would remain undesirably low, only to experience a large overshoot once the next available load current measurement becomes available and Vtgt experiences a corresponding larger jump. The blind load line adjustment technique described herein mitigates against a large increase in target voltage Vtgt and hence the output voltage Vout during transient load current events, thus reducing Vout overshoot. The number and size of the adjustment steps available to the transient response circuit 120 is flexible and may be programmable.

Figure 6:
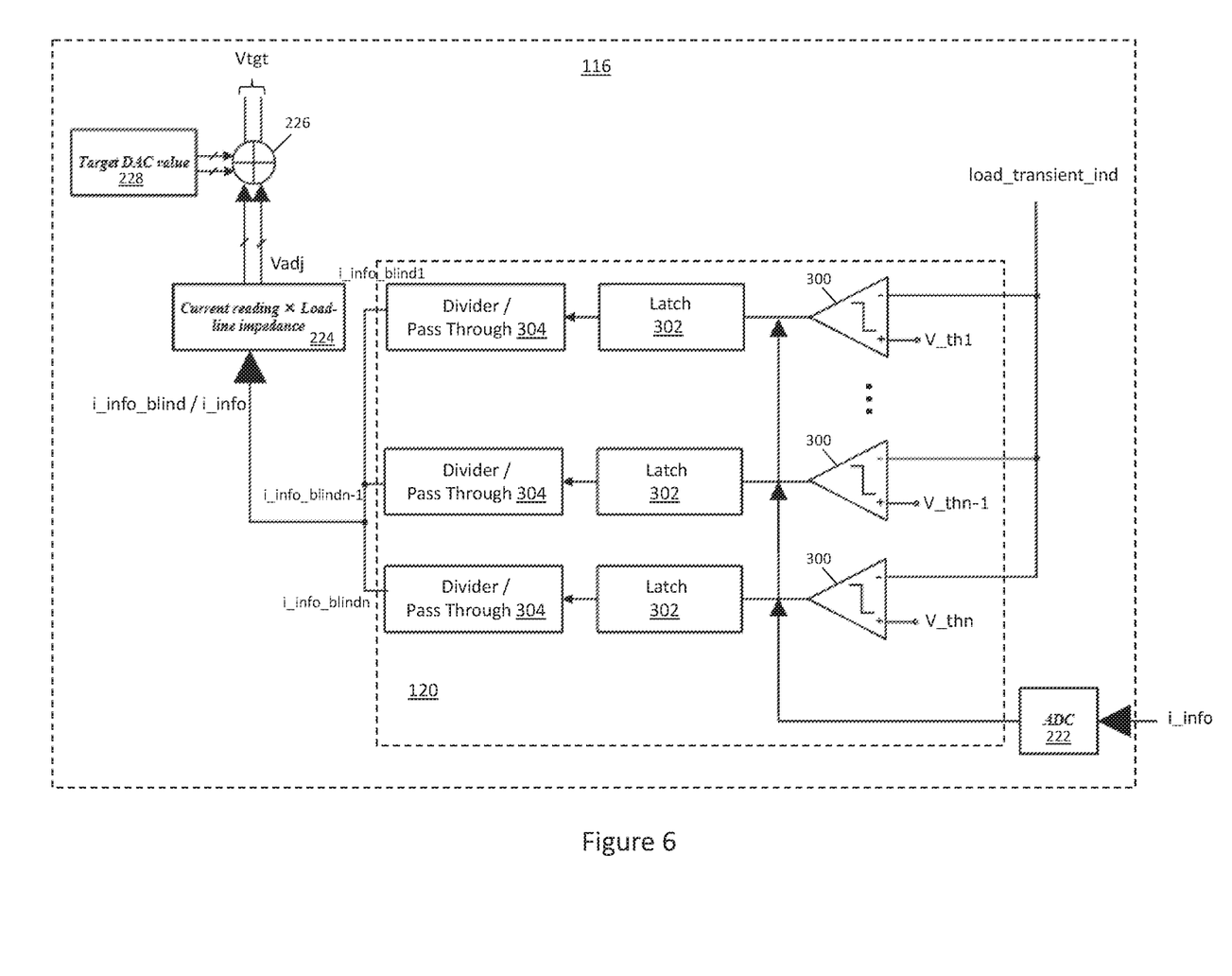
FIG. 6 illustrates a block diagram of another embodiment of the transient response circuit included in or associated with the load line regulation circuit.

FIG. 6 illustrates another embodiment of the transient response circuit 120 included in or associated with the load line regulation circuit 116. According to this embodiment, the transient response circuit 120 includes a plurality of comparators 300 each for comparing a signal 'load_transient_ind' available within the power converter controller 110 and that is indicative of a load current transient to a corresponding threshold value 'V_thx'. There are n comparators and n different threshold values in this embodiment, where n is an integer greater than or equal to 2. As previously explained herein, the signal load_transient_ind that is indicative of a load current transient may be a floor voltage signal from a COT control scheme implemented by the modulator 112, a PWM pulse frequency or period associated with the modulation control scheme, the sensed output voltage Vout, an AFE analog signal indicative of a load current transient, etc. In each case, employing multiple comparators 300 and different threshold values V_thx allows for increased flexibility in the number and size of adjustment steps made by the transient response circuit 120 in response to load current transients. As more thresholds are exceeded, the transient response circuit 120 detects a larger and larger transient and makes further corresponding step adjustments.

The output of each comparator 300 may set a corresponding latch 302, e.g., as previously explained herein in connection with FIG. 2. The output of each latch 302 may be coupled to a corresponding divider/pass through circuit 304, e.g., also as previously explained herein in connection with FIG. 2. If the output of the corresponding latch 302 indicates that the threshold of the comparator 300 upstream was exceeded, the divider/pass through circuit 304 divides the most recent update to the sensed load current information i_info by a scaling factor to generate a blindly scaled current value. The scaling factors of the divider/pass through circuits 304 are different from one another, to allow for different adjustments to the blind load current information i_info_blind provided to the multiplication unit 224 of the load line regulation circuit 116, the different adjustments corresponding to the magnitude of the signal 'load_transient_ind' indicative of load current transients. For example, the first scaling factor may be 2, the second 4, the third 8, etc. This way, for increasingly larger load current transients, larger step adjustments may be made to the target voltage value Vtgt used in the load line regulation. When new updates to the sensed load current information i_info become available, the divider/pass through circuits 304 pass through the newly available sensed load current information i_info without modification and the target voltage Vtgt is adjusted based on this unscaled and real/new current information.

Figure 7:
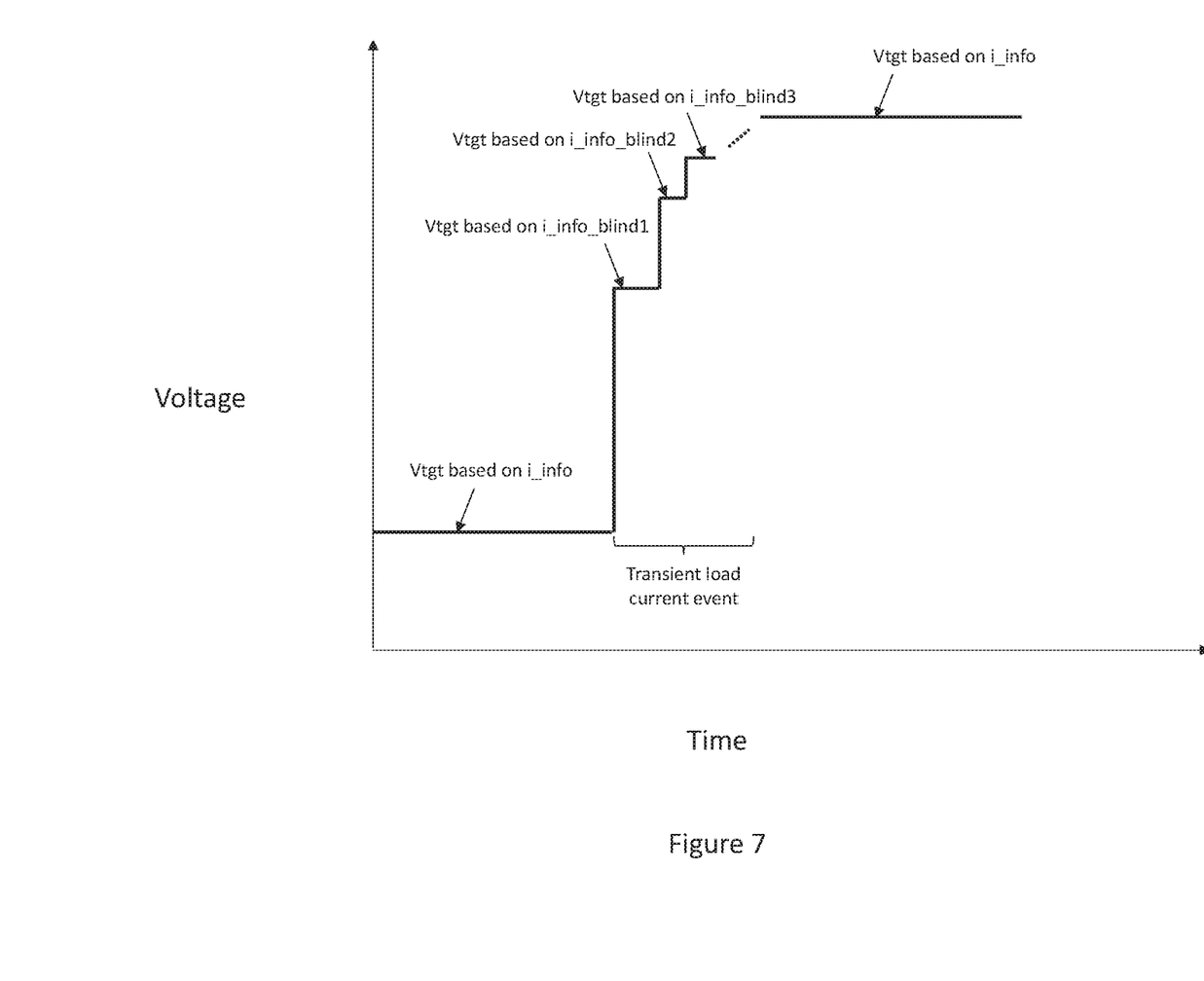
FIG. 7 illustrates a waveform diagram of an example of the multi-step adjustment technique implemented by the transient response circuit shown in FIG. 6.

FIG. 7 illustrates an example of the multi-step adjustment embodiment illustrated in FIG. 6. By providing multiple comparators 300 and corresponding latches 302 and divider/pass through circuits 304, the blind load current information i_info_blind provided to the load line regulation circuit 116 may result in different step-wise adjustments to the target voltage value Vtgt used in the load line regulation for different load current transients. Each adjustment step corresponds to a triggering of a respective one of the comparators 300.

For relatively large load current transients, the 'load_transient_ind' signal is likely to exceed several and perhaps all of the comparator thresholds V_thx. The blind load current information i_info_blind provided by the transient response circuit 120 is further scaled and an additional stepwise adjustment is made to the target voltage value Vtgt each time another comparator threshold V_thx is exceeded. The load line regulation circuit 116 multiplies the load line impedance value with the corresponding blindly scaled current value (i_info_blind1, i_info_blind2, etc.) received from the transient response circuit 120 to generate a corresponding voltage modification value Vadj. The modification circuit 226 of the load line regulation circuit 116 adjusts the target voltage Vtgt based on the voltage modification value Vadj.

For relatively small load current transients, fewer comparators 300 trip and less scaling is done to the blind load current information i_info_blind. Accordingly, fewer and perhaps only one stepwise adjustment is made to the target voltage value Vtgt as a result. Instead of stepwise adjustments to the target voltage value Vtgt, a more continuous scaling of the blind load current information i_info_blind may be implemented by the transient response circuit 120 during load current transients.

Although the present disclosure is not so limited, the following numbered examples demonstrate one or more aspects of the disclosure.

Example 1. A method of implementing a load line in a power converter, the method comprising: adjusting a target voltage used to regulate an output voltage of the power converter, based on sensed load current information that has delay between updates; and responsive to detecting a load current transient and before the next update to the sensed load current information becomes available, adjusting the target voltage based on blind load current information.

Example 2. The method of example 1, wherein the sensed load current information is not updated during at least a portion of the detected load current transient, and wherein adjusting the target voltage based on the blind load current information comprises: scaling a sensed load current information update available prior to detecting the load current transient, to generate a blindly scaled current value; and adjusting the target voltage based on the blindly scaled current value.

Example 3. The method of example 2, wherein the detected load current transient corresponds to a drop in load current, and wherein the scaling comprises: dividing the sensed load current information update available prior to detecting the load current transient by a positive integer greater than or equal to 2.

Example 4. The method of example 2 or 3, further comprising: adjusting the target voltage based on new updates to the sensed load current information that become available after the target voltage was updated based on the blind load current information.

Example 5. The method of any of examples 1 through 4, wherein detecting the load current transient comprises: detecting when a floor voltage signal used in a constant-on-time (COT) control scheme implemented by a controller of the power converter passes a threshold value.

Example 6. The method of any of examples 1 through 5, wherein the power converter implements pulse width modulation (PWM) control in regulating the output voltage, and wherein detecting the load current transient comprises: detecting when a pulse frequency of the PWM control changes by a predetermined amount.

Example 7. The method of any of examples 1 through 6, wherein detecting the load current transient comprises: detecting when an overshoot of the output voltage exceeds a threshold.

Example 8. The method of any of examples 1 through 7, wherein detecting the load current transient comprises: detecting when a signal available within a controller of the power converter and that is indicative of the load current transient passes a first threshold value.

Example 9. The method of example 8, wherein adjusting the target voltage based on the blind load current information comprises: responsive to detecting when the signal passes the first threshold value, scaling a sensed load current information update available prior to detecting the load current transient by a first scaling factor to generate a first blindly scaled current value; and adjusting the target voltage based on the first blindly scaled current value.

Example 10. The method of example 9, wherein the detected load current transient corresponds to a drop in load current, the method further comprising: detecting when the signal passes a second threshold value lower than the first threshold value; responsive to detecting when the signal passes the second threshold value, scaling the sensed load current information update available prior to detecting the load current transient by a second scaling factor greater than the first scaling factor to generate a second blindly scaled current value that is lower than the first blindly scaled current value; and adjusting the target voltage based on the second blindly scaled current value.

Example 11. A controller configured to implement a load line for a power converter, the controller comprising: a modulator configured to adjust a target voltage used to regulate an output voltage of the power converter, based on sensed load current information that has delay between updates; and a transient response circuit configured to detect a load current transient and responsive to detecting the load current transient and before the next update to the sensed load current information becomes available, to adjust the target voltage based on blind load current information.

Example 12. The controller of example 11, wherein the sensed load current information is not updated during at least a portion of the detected load current transient, and wherein the transient response circuit is configured to scale a sensed load current information update available prior to detecting the load current transient to generate a blindly scaled current value, and to adjust the target voltage based on the blindly scaled current value.

Example 13. The controller of example 12, wherein the detected load current transient corresponds to a drop in load current, and wherein the transient response circuit is configured to divide the sensed load current information update available prior to detecting the load current transient by a positive integer greater than or equal to 2.

Example 14. The controller of example 12 or 13, wherein the transient response circuit is configured to adjust the target voltage based on new updates to the sensed load current information that become available after the target voltage was updated based on the blind load current information.

Example 15. The controller of any of examples 11 through 14, wherein the transient response circuit comprises a comparator configured to compare a floor voltage signal used in a constant-on-time (COT) control scheme implemented by the modulator to a threshold value, and to output a signal when the floor voltage passes the threshold value to indicate the load current transient is detected.

Example 16. The controller of any of examples 11 through 15, wherein the modulator is configured to implement pulse width modulation (PWM) control in regulating the output voltage of the power converter, and wherein the transient response circuit is configured to detect the load current transient when a pulse frequency of the PWM control changes by a predetermined amount.

Example 17. The controller of any of examples 11 through 16, wherein the transient response circuit is configured to detect the load current transient when an overshoot of the output voltage exceeds a threshold.

Example 18. The controller of any of examples 11 through 17, wherein the transient response circuit comprises: a first comparator configured to compare a signal available within the controller and that is indicative of the load current transient to a first threshold value, the first comparator having an output that indicates when the signal passes the threshold value; and a first latch configured to store the output of the first comparator.

Example 19. The controller of example 18, wherein the detected load current transient corresponds to a drop in load current, and wherein the transient response circuit comprises: a first divider circuit configured to divide a sensed load current information update available prior to detecting the load current transient by a first scaling factor if an output of the first latch indicates the signal passed the first threshold value, to generate a first blindly scaled current value, the controller further comprising: a load line regulation circuit configured to multiply a load line impedance value with the first blindly scaled current value to generate a first voltage modification value; and a modification circuit configured to adjust the target voltage based on the first voltage modification value.

Example 20. The controller of example 19, wherein the transient response circuit comprises: a second comparator configured to compare the signal that is indicative of the load current transient to a second threshold value lower than the first threshold value, the second comparator having an output that indicates when the signal passes the second threshold value; a second latch configured to store the output of the second comparator; and a second divider circuit configured to divide the sensed load current information update available prior to detecting the load current transient by a second scaling factor greater than the first scaling factor if an output of the second latch indicates the signal passed the second threshold value, to generate a second blindly scaled current value, wherein the load line regulation circuit is configured to multiply the load line impedance value with the second blindly scaled current value to generate a second voltage modification value, and wherein the modification circuit is configured to adjust the target voltage based on the second voltage modification value.

Example 21. The controller of example 19 or 20, wherein the first latch is configured to indicate when a new update to the sensed load current information becomes available after the target voltage was updated based on the blind load current information, wherein the load line regulation circuit is configured to multiply the load line impedance value with the new update to the sensed load current information, to generate a new voltage modification value, and wherein the modification circuit is configured to adjust the target voltage based on the new voltage modification value.

Example 22. A power converter, comprising: at least one phase configured to provide a phase current to a load coupled to the power converter; and a controller configured to implement a load line for the power converter, the controller comprising: a modulator configured to adjust a target voltage used to regulate an output voltage of the power converter, based on sensed load current information that has delay between updates; and a transient response circuit configured to detect a load current transient and responsive to detecting the load current transient and before the next update to the sensed load current information becomes available, to adjust the target voltage based on blind load current information.

Example 23. An electronic system, comprising: a circuit board; a load attached to the circuit board; and a power converter configured to provide power to the load, wherein the power converter comprises: at least one phase configured to provide a phase current to the load; and a controller configured to implement a load line for the power converter, wherein the controller comprises: a modulator configured to adjust a target voltage used to regulate an output voltage of the power converter provided to the load, based on sensed load current information that has delay between updates; and a transient response circuit configured to detect a load current transient at the load and responsive to detecting the load current transient and before the next update to the sensed load current information becomes available, to adjust the target voltage based on blind load current information.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of implementing a load line in a power converter, the method comprising:
adjusting a target voltage used to regulate an output voltage of the power converter, based on sensed load current information that has delay between updates; and
responsive to detecting a load current transient and before the next update to the sensed load current information becomes available, adjusting the target voltage based on blind load current information,
wherein the sensed load current information is not updated during at least a portion of the detected load current transient, and
wherein adjusting the target voltage based on the blind load current information comprises:
scaling a sensed load current information update available prior to detecting the load current transient, to generate a blindly scaled current value; and
adjusting the target voltage based on the blindly scaled current value.

2. The method of claim 1, wherein the detected load current transient corresponds to a drop in load current, and wherein the scaling comprises:
dividing the sensed load current information update available prior to detecting the load current transient by a positive integer greater than or equal to 2.

3. The method of claim 1, further comprising:
adjusting the target voltage based on new updates to the sensed load current information that become available after the target voltage was updated based on the blind load current information.

4. The method of claim 1, wherein detecting the load current transient comprises:
detecting when a floor voltage signal used in a constant-on-time (COT) control scheme implemented by a controller of the power converter passes a threshold value.

5. The method of claim 1, wherein the power converter implements pulse width modulation (PWM) control in regulating the output voltage, and wherein detecting the load current transient comprises:
detecting when a pulse frequency of the PWM control changes by a predetermined amount.

6. The method of claim 1, wherein detecting the load current transient comprises:
detecting when an overshoot of the output voltage exceeds a threshold.

7. A controller configured to implement a load line for a power converter, the controller comprising:
a modulator configured to adjust a target voltage used to regulate an output voltage of the power converter, based on sensed load current information that has delay between updates; and
a transient response circuit configured to detect a load current transient and responsive to detecting the load current transient and before the next update to the sensed load current information becomes available, to adjust the target voltage based on blind load current information,
wherein the sensed load current information is not updated during at least a portion of the detected load current transient, and
wherein the transient response circuit is configured to scale a sensed load current information update available prior to detecting the load current transient to generate a blindly scaled current value, and to adjust the target voltage based on the blindly scaled current value.

8. The controller of claim 7, wherein the detected load current transient corresponds to a drop in load current, and wherein the transient response circuit is configured to divide the sensed load current information update available prior to detecting the load current transient by a positive integer greater than or equal to 2.

9. The controller of claim 7, wherein the transient response circuit is configured to adjust the target voltage based on new updates to the sensed load current information that become available after the target voltage was updated based on the blind load current information.

10. The controller of claim 7, wherein the transient response circuit comprises a comparator configured to compare a floor voltage signal used in a constant-on-time (COT) control scheme implemented by the modulator to a threshold value, and to output a signal when the floor voltage passes the threshold value to indicate the load current transient is detected.

11. The controller of claim 7, wherein the modulator is configured to implement pulse width modulation (PWM) control in regulating the output voltage of the power converter, and wherein the transient response circuit is configured to detect the load current transient when a pulse frequency of the PWM control changes by a predetermined amount.

12. The controller of claim 7, wherein the transient response circuit is configured to detect the load current transient when an overshoot of the output voltage exceeds a threshold.

13. A power converter, comprising:
at least one phase configured to provide a phase current to a load coupled to the power converter; and
a controller configured to implement a load line for the power converter, the controller comprising:
a modulator configured to adjust a target voltage used to regulate an output voltage of the power converter, based on sensed load current information that has delay between updates; and
a transient response circuit configured to detect a load current transient and responsive to detecting the load current transient and before the next update to the sensed load current information becomes available, to adjust the target voltage based on blind load current information,
wherein the sensed load current information is not updated during at least a portion of the detected load current transient, and
wherein the transient response circuit is configured to scale a sensed load current information update available prior to detecting the load current transient to generate a blindly scaled current value, and to adjust the target voltage based on the blindly scaled current value.

14. An electronic system, comprising:
a circuit board;
a load attached to the circuit board; and
a power converter configured to provide power to the load,
wherein the power converter comprises:
at least one phase configured to provide a phase current to the load; and a controller configured to implement a load line for the power converter,
wherein the controller comprises:
a modulator configured to adjust a target voltage used to regulate an output voltage of the power converter provided to the load, based on sensed load current information that has delay between updates; and
a transient response circuit configured to detect a load current transient at the load and responsive to detecting the load current transient and before the next update to the sensed load current information becomes available, to adjust the target voltage based on blind load current information,
wherein the sensed load current information is not updated during at least a portion of the detected load current transient, and
wherein the transient response circuit is configured to scale a sensed load current information update available prior to detecting the load current transient to generate a blindly scaled current value, and to adjust the target voltage based on the blindly scaled current value.

15. A method of implementing a load line in a power converter, the method comprising:
adjusting a target voltage used to regulate an output voltage of the power converter, based on sensed load current information that has delay between updates; and
responsive to detecting a load current transient and before the next update to the sensed load current information becomes available, adjusting the target voltage based on blind load current information,
wherein the power converter implements pulse width modulation (PWM) control in regulating the output voltage, and
wherein detecting the load current transient comprises detecting when a pulse frequency of the PWM control changes by a predetermined amount.

16. A method of implementing a load line in a power converter, the method comprising:
adjusting a target voltage used to regulate an output voltage of the power converter, based on sensed load current information that has delay between updates; and
responsive to detecting a load current transient and before the next update to the sensed load current information becomes available, adjusting the target voltage based on blind load current information,
wherein detecting the load current transient comprises detecting when a signal available within a controller of the power converter and that is indicative of the load current transient passes a first threshold value,
wherein adjusting the target voltage based on the blind load current information comprises:
responsive to detecting when the signal passes the first threshold value, scaling a sensed load current information update available prior to detecting the load current transient by a first scaling factor to generate a first blindly scaled current value; and
adjusting the target voltage based on the first blindly scaled current value.

17. The method of claim 16, wherein the detected load current transient corresponds to a drop in load current, the method further comprising:
detecting when the signal passes a second threshold value lower than the first threshold value;
responsive to detecting when the signal passes the second threshold value, scaling the sensed load current information update available prior to detecting the load current transient by a second scaling factor greater than the first scaling factor to generate a second blindly scaled current value that is lower than the first blindly scaled current value; and
adjusting the target voltage based on the second blindly scaled current value.

18. A controller configured to implement a load line for a power converter, the controller comprising:
a modulator configured to adjust a target voltage used to regulate an output voltage of the power converter, based on sensed load current information that has delay between updates; and
a transient response circuit configured to detect a load current transient and responsive to detecting the load current transient and before the next update to the sensed load current information becomes available, to adjust the target voltage based on blind load current information,
wherein the modulator is configured to implement pulse width modulation (PWM) control in regulating the output voltage of the power converter, and
wherein the transient response circuit is configured to detect the load current transient when a pulse frequency of the PWM control changes by a predetermined amount.

19. A controller configured to implement a load line for a power converter, the controller comprising:
a modulator configured to adjust a target voltage used to regulate an output voltage of the power converter, based on sensed load current information that has delay between updates; and
a transient response circuit configured to detect a load current transient and responsive to detecting the load current transient and before the next update to the sensed load current information becomes available, to adjust the target voltage based on blind load current information,
wherein the transient response circuit comprises:
a first comparator configured to compare a signal available within the controller and that is indicative of the load current transient to a first threshold value, the first comparator having an output that indicates when the signal passes the threshold value; and
a first latch configured to store the output of the first comparator,
wherein the detected load current transient corresponds to a drop in load current,
wherein the transient response circuit comprises a first divider circuit configured to divide a sensed load current information update available prior to detecting the load current transient by a first scaling factor if an output of the first latch indicates the signal passed the first threshold value, to generate a first blindly scaled current value,
wherein the controller further comprises:
a load line regulation circuit configured to multiply a load line impedance value with the first blindly scaled current value to generate a first voltage modification value; and
a modification circuit configured to adjust the target voltage based on the first voltage modification value.

20. The controller of claim 19, wherein the transient response circuit comprises:

a second comparator configured to compare the signal that is indicative of the load current transient to a second threshold value lower than the first threshold value, the second comparator having an output that indicates when the signal passes the second threshold value;

a second latch configured to store the output of the second comparator; and a second divider circuit configured to divide the sensed load current information update available prior to detecting the load current transient by a second scaling factor greater than the first scaling factor if an output of the second latch indicates the signal passed the second threshold value, to generate a second blindly scaled current value, wherein the load regulation line circuit is configured to multiply the load line impedance value with the second blindly scaled current value to generate a second voltage modification value, and wherein the modification circuit is configured to adjust the target voltage based on the second voltage modification value.

21. The controller of claim 19, wherein the first latch is configured to indicate when a new update to the sensed load current information becomes available after the target voltage was updated based on the blind load current information, wherein the load line regulation circuit is configured to multiply the load line impedance value with the new update to the sensed load current information, to generate a new voltage modification value, and wherein the modification circuit is configured to adjust the target voltage based on the new voltage modification value.

* * * * *